United States Patent [19]

Doi et al.

[11] Patent Number: 4,983,474

[45] Date of Patent: Jan. 8, 1991

[54] HYDROGEN ABSORBING NI-BASED ALLOY AND RECHARGEABLE ALKALINE BATTERY

[75] Inventors: Hidekazu Doi, Omiya; Ritsue Yabuki, Iwatsuki, both of Japan

[73] Assignee: Mitsubishi Metal Corporation, Tokyo, Japan

[21] Appl. No.: 353,017

[22] Filed: May 17, 1989

[30] Foreign Application Priority Data

| May 17, 1988 | [JP] | Japan | 63-119576 |
| Oct. 18, 1988 | [JP] | Japan | 63-262365 |
| Oct. 18, 1988 | [JP] | Japan | 63-262366 |
| Jan. 19, 1989 | [JP] | Japan | 1-10446 |
| Jan. 19, 1989 | [JP] | Japan | 1-10447 |

[51] Int. Cl.$^5$ .................... H01M 10/52; C22C 19/03
[52] U.S. Cl. .................... 429/59; 429/101; 420/458; 420/459; 420/460; 420/900
[58] Field of Search .................. 429/59, 101; 420/458, 420/459, 460, 900

[56] References Cited

U.S. PATENT DOCUMENTS

| 3,837,933 | 9/1974 | Masumoto et al. | 420/459 X |
| 4,440,720 | 4/1984 | Masumoto et al. | 420/459 |
| 4,832,913 | 5/1989 | Hong et al. | 420/900 X |

FOREIGN PATENT DOCUMENTS

| 3151712 | 6/1984 | Fed. Rep. of Germany | 420/900 |
| 61-091863 | 5/1986 | Japan | 420/900 |

*Primary Examiner*—Stephen J. Kalafut
*Attorney, Agent, or Firm*—Oblon, Spivak, McClelland, Maier & Neustadt

[57] ABSTRACT

A hydrogen absorbing Ni-based alloy comprising 5 to 25% by weight of titanium (Ti), 10 to 37% by weight of zirconium (Zr), 4 to 20% by weight of manganese (Mn), 0.1 to 12% by weight of vanadium (V), 0.01 to 5% by weight of iron (Fe), 0.01 to 4.5% by weight of aluminum (Al), and balance nickel (Ni) and unavoidable impurities, and a sealed Ni-hydrogen rechargeable battery comprising a negative electrode provided with such a hydrogen absorbing alloy as an active material, an Ni positive electrode, a separator and an alkaline electrolyte solution.

22 Claims, No Drawings

HYDROGEN ABSORBING NI-BASED ALLOY AND RECHARGEABLE ALKALINE BATTERY

BACKGROUND OF THE INVENTION

1. Field of the Invention

The present relates to hydrogen absorbing Ni-based alloys and sealed rechargeable alkaline batteries or cells containing such alloys as an active material for their negative electrodes.

2. Description of Prior Art

Generally, sealed Ni-hydrogen rechargeable batteries include a negative electrode provided with a hydrogen absorbing alloy as an active material, an Ni positive electrode, a separator and an alkaline electrolyte. The hydrogen absorbing alloys constituting the negative electrode are desired to have the following characteristics, for example.

(a) They have high capability to absorb and release hydrogen.

(b) They show a relatively low equilibrium hydrogen dissociation pressure (which corresponds to the plateau pressure on PCT curve at a temperature in the vicinity of room temperature) as low as not higher than 5 atm.

(c) They exhibit high corrosion resistance and high durability or resistance to deterioration or aging.

(d) They show high hydrogen oxidizing capability (or catalytic activity).

(e) They are hardly converted to fine powder when absorption and release of hydrogen are repeated.

(f) They cause no or less environmental pollution.

(g) Their cost is low.

As is well known in the art, sealed Ni-hydrogen rechargeable batteries using as an active material such hydrogen absorbing alloy as having the above-listed characteristics could exhibit various desirable characteristics such as large discharge capability, long lifetime of repeated cycle of charging and discharging, excellent rapid charging and discharging characteristics, and low self-discharge.

Therefore, research and development have been made increasingly on hydrogen absorbing alloys suitable for use as an active material in batteries, particularly sealed Ni-hydrogen rechargeable batteries and various hydrogen absorbing alloys have been proposed as described, for example, in JP-A-61-45563 and JP-A-60-241652.

However, none of the hydrogen absorbing alloys thus far proposed does always satisfy all the characteristics required for as the active material for the negative electrodes in sealed Ni-hydrogen rechargeable batteries, and therefore further development is now desired.

SUMMARY OF THE INVENTION

Therefore, an object of the present invention is to provide a hydrogen absorbing alloy satisfying the above-described characteristics or requirements.

Another object of the present invention is to provide a sealed Ni-hydrogen rechargeable battery containing such a hydrogen absorbing alloy as an active material.

As the result of intensive research, it has now been found that inclusion of Al meets the above requirements, and the present invention is based on the discovery.

The present invention provides a hydrogen absorbing Ni-based alloy comprising 5 to 25% by weight of titanium (Ti), 10 to 37% by weight of zirconium (Zr), 4 to 20% by weight of manganese (Mn), 0.1 to 12% by weight of vanadium (V), 0.01 to 5% by weight of iron (Fe), 0.01 to 4.5% by weight of aluminum (Al), and balance nickel (Ni) and unavoidable impurities.

Also, the present invention provides a sealed Ni-hydrogen rechargeable battery comprising a negative electrode provided with a hydrogen absorbing alloy as an active material, an Ni positive electrode, a separator and an alkaline electrolyte, wherein the hydrogen absorbing alloy is composed of a hydrogen absorbing Ni-based alloy comprising 5 to 25% by weight of Ti, 10 to 37% by weight of Zr, 4 to 20% by weight of Mn, 0.1 to 12% by weight of V, 0.01 to 5% by weight of Fe, 0.01 to 4.5% by weight of Al, and balance Ni and unavoidable impurities.

The hydrogen absorbing Ni-based alloy of the present invention exhibits the above-described characteristics required for when used as an active material for the negative electrode of sealed Ni-hydrogen rechargeable batteries. The Ni-hydrogen rechargeable battery of the present invention has high energy density and high discharge capability as well as prolonged lifetime, shows low self discharge, realizes charge-discharge at high efficiency, causes no environmental pollution, and incurs low cost.

DETAILED DESCRIPTION OF THE INVENTION

Hereinafter, the components of the hydrogen absorbing Ni-based alloy of the present invention will be described in detail.

(a) Titanium (Ti) and Zirconium (Zr)

Ti and Zr together not only endow the alloy with hydrogen absorption and release capabilities but also lower the equilibrium hydrogen dissociation pressure (plateau pressure) at room temperature to a level, e.g., as low as 5 atm. However, when the contents of Ti and Zr are less than 5% by weight and less than 10% by weight, respectively, desired effects are not obtained. On the other hand, when the content of Ti exceeds 25% by weight, the equilibrium hydrogen dissociation pressure increases undesirably high, e.g. as high as 5 atm or more, resulting in that in order to obtain high discharge capability, high hydrogen dissociation pressure is required, which is undesirable to rechargeable batteries. When the content of Zr exceeds 37% by weight, the hydrogen absorption and release capabilities decreases to a level practically unacceptable although it causes no problem from the viewpoint of dependency of the discharge capability on the hydrogen dissociation pressure. Therefore, the contents of Ti and Zr are set up for 5 to 20% by weight, and 10 to 37% by weight, respectively. In the case where W is not co-present in the alloy, the content of Ti is preferably 5 to 20% by weight. Further, the atomic ratio of Ti/Zr is preferably in the range between 40/60 to 55/45. In this range, the hydrogen absorbing Ni-based alloy has improved properties with respect to hydrogen absorption and release capabilities and discharge capability.

(b) Manganese (Mn)

Mn is effective in improving the hydrogen absorption and release capabilities of the alloy and also increases the corrosion resistance and durability of the alloy in alkaline electrolytes. Mn is also effective in preventing self discharge when the alloy is used as an active material for the negative electrode of a rechargeable battery. The effects of Mn are not fully obtained when its content is below 4% by weight, and on the other hand the hydrogen absorption and release characteristics is deteriorated when the content of Mn exceeds 20% by weight. For this reason, the content of Mn ranges from 4 to 20% by weight. When W is not co-present, the content of Mn is preferably 4 to 18% by weight.

(c) Vanadium (V)

As described above, it is desired that sealed Ni-hydrogen rechargeable batteries have equilibrium hydrogen dissociation pressure at room temperature which is not too high (for example, 5 atm or less) and can absorb and release as much as hydrogen, and vanadium contributes to the increase in the amount of hydrogen absorbed or released and to the adjustment of equilibrium hydrogen pressure. When the content of V is less than 0.1% by weight, desired effects are not obtained, and on the other hand, the equilibrium hydrogen pressure will be too high and the element will dissolve in the electrolyte solution, resulting in that the self discharge of the battery will be promoted when the content of V exceeds 10% by weight. Therefore, the content of V is set up in the range of from 0.1 to 10% by weight.

(d) Iron (Fe)

Fe has an activity of adjusting the particle size of the alloy used as an active material for the negative electrode of rechargeable batteries upon the pulverization of the alloy. When the content of Fe is below 0.01% by weight, the desired effects are not obtained. On the other hand, the corrosion resistance of the alloy decreases to promote self discharge of the rechargeable battery when it is above 5% by weight. Thus, the content of Fe is selected to be 0.01 to 5% by weight.

(e) Aluminum (Al)

Al is effective in further improving the corrosion resistance of the alloy to reduce or prevent the self discharge of the battery without deteriorating the hydrogen absorption and release capabilities of the alloy. However, the desired effects are not obtained when the content of Al is below 0.01% by weight while the hydrogen absorption and release capabilities decreases considerably when its content exceeds 4.5% by weight. When W is not co-present, the content of Al is preferably 0.01 to 3.5% by weight.

The hydrogen absorbing Ni-based alloy of the present invention may contain one or more additional elements such as copper (Cu), chromium (Cr) and tungsten (W). More particularly, the alloy of the present invention may contain 0.1 to 7% by weight of Cu, 0.05 to 6% by weight of Cr and/or 0.01 to 15% by weight of W.

(f) Copper (Cu)

Cu, in the co-presence of V, further increases the amount of hydrogen absorbed or released and also further promotes the adjustment of the equilibrium hydrogen pressure. However, when the content of Cu is below 0.1% by weight, the desired effects are not obtained while decrease in the amount of hydrogen absorbed or released and in the discharge capability will result when the content of Cu is above 7% by weight.

(g) Chromium (Cr)

Cr, particularly in co-presence of Al, is effective in further improving the corrosion resistance of the alloy. When its content is below 0.05% by weight, the desired effects are not obtained, and on the other hand, when its content exceeds 6% by weight, the hydrogen absorption and release capabilities decrease. Therefore, the content of Cr is set up to 0.05 to 6% by weight.

(h) Tungsten (W)

W adds to further improve the corrosion resistance of the alloy in the alkaline electrolyte solution constituting the rechargeable battery and also improve the durability of the alloy. It prevents the self discharge of the alloy upon practical use as the active material. However, when the content of W is below 0.01% by weight, the desired effects are not obtained. On the other hand, when it exceeds 13% by weight, the hydrogen absorption and release capabilities are deteriorated. Therefore, the content of W is set up to 0.01 to 13% by weight.

The composition of the alloy may be varied suitably within the above-described general range.

Typical examples of the hydrogen absorbing Ni-based alloy of the present invention include the following alloys.

(i) A hydrogen absorbing Ni-based alloy consisting of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, and balance Ni and unavoidable impurities.

(ii) A hydrogen absorbing Ni-based alloy consisting of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.05 to 6% by weight of Cr, and balance Ni and unavoidable impurities.

(iii) A hydrogen absorbing Ni-based alloy consisting of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu and balance Ni and unavoidable impurities.

(iv) A hydrogen absorbing Ni-based alloy consisting of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu, 0.05 to 6% by weight of Cr, and balance Ni and unavoidable impurities.

(v) A hydrogen absorbing Ni-based alloy consisting of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.01 to 13% by weight of W, and balance Ni and unavoidable impurities.

(vi) A hydrogen absorbing Ni-based alloy consisting of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.05 to 6% by weight of Cr, 0.01 to 13% by weight of W, and balance Ni and unavoidable impurities.

(vii) A hydrogen absorbing Ni-based alloy consisting of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.01 to 13% by weight of W, and balance Ni and unavoidable impurities.

(viii) A hydrogen absorbing Ni-based alloy consisting of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.05 to 6% by weight of Cr, 0.01 to 13% by weight of W, and balance Ni and unavoidable impurities.

(ix) A hydrogen absorbing Ni-based alloy consisting of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe and Al provided that Fe and Al are present in amounts not smaller than 0.01% by weight, respectively, and balance Ni and unavoidable impurities.

(x) A hydrogen absorbing Ni-based alloy consisting of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe, Al and Cr provided that Fe and Al are present in amounts not smaller than 0.01% by weight, respectively, and that Cr is present in an amount not smaller than 0.05% by weight, and balance Ni and unavoidable impurities.

The sealed Ni-hydrogen rechargeable battery of the present invention is characterized by the use of the above-described hydrogen absorbing Ni-based alloys as the active material for the negative electrode. Basic constructions or compositions of other elements or members of the rechargeable battery such as electrodes, separator, alkaline electrolyte solution may be the same as used in the conventional sealed Ni-hydrogen rechargeable batteries.

In the sealed Ni-hydrogen rechargeable battery of the present invention, there can be used various types of hydrogen absorbing Ni-based alloys including those described in (i) to (x) above.

The sealed Ni-hydrogen rechargeable batteries of the present invention can be manufactured in the conventional manner. For example, the elements or metals are melted by ordinary melting method to prepare molten Ni alloys having predetermined compositions, which are then cast into ingots. The ingots are then pulverized to obtain crude powders, which are subsequently ground to convert them into fine powders. The fine alloy powders are mixed with a binder and other additives, if desired, and kneaded to obtain pastes. The pastes are uniformly filled into nonwoven Ni whisker or Ni foam sheets and the resulting composites are dried and pressed, if desired, to obtain sheet like products which can serve as negative electrodes. The negative electrodes thus produced can be assembled together with positive electrodes and alkaline electrolytic solutions commonly used to give sealed Ni-hydrogen rechargeable batteries.

EXAMPLES

The present invention will be described in greater detail with reference to the following examples and comparative examples. However, the present invention should not be construed as being limited to the examples.

Unless otherwise described specifically percentages are all by weight (except for % residual capability).

EXAMPLE 1

(a) Preparation of Ni-Based Alloy Powders

Molten Ni alloys having the respective compositions shown in Tables 1a and 1b were prepared in argon (Ar) atmosphere using a conventional high frequency induction furnace, and cast in a copper mold to form ingots. The ingots were annealed by holding them in Ar atmosphere at a predetermined temperature in the range of from 900° to 1000° C. for 5 hours, followed by crashing them into crude powders having a particle size not larger than 2 mm using a jaw crusher. The crude powders were further ground to fine powders having a particle size of not larger than 350 mesh using a ball mill to obtain hydrogen absorbing Ni-based alloy samples Nos. A-1 to A-19, comparative samples Nos. a-1 to a-8. and conventional sample No. a'.

(b) Manufacture of Ni-Hydrogen Rechargeable Batteries

The hydrogen absorbing Ni-based alloy powders each were mixed with a 2% aqueous polyvinyl alcohol (PVA) solution to obtain pastes, each of which was then filled into an Ni whisker nonwoven fabric which was commercially available and had a porosity of 95%. The paste-filled nonwoven fabric composites were dried and pressed to form thin sheet-like pieces having a plane size of 42 mm×35 mm and a thickness of 0.60 to 0.65 mm. The amount of the active material filled in the fabric was about 2.8 g per piece. A thin Ni sheet serving as a lead was attached by welding to each of the paste-filled fabric piece at one of the edges thereof to form a negative electrode. On the other hand, two sintered Ni oxides sheets having the same size as the negative electrode were provided as a positive electrode, and an open type Ni-hydrogen rechargeable battery was produced by arranging the Ni oxides positive electrodes and the negative electrode in an appropriate vessel so that the Ni oxides positive electrodes sandwich the negative electrode and charging a 30% aqueous KOH solution in the vessel.

In the thus-obtained open type rechargeable batteries, the capability of the positive electrodes were made significantly larger than that of the negative electrodes to enable the determination of the capability of the negative electrodes.

The comparative hydrogen absorbing Ni-based alloy samples Nos. a-1 to a-11 had compositions outside the scope of the present invention. More particularly, the contents of the component elements marked by a symbol (*) shown in Table 1b were outside the scope of the present invention.

(c) Determination of Discharge Capability

The thus-obtained rechargeable batteries with different active materials were subjected to charge-discharge tests under the conditions of a discharge rate: 0.2 C (Coulomb), and a charge amount: 130% of the capability of the negative electrode. After 100 cycles, 200 cycles or 300 cycles or charge-discharge (one cycle consisting of one charge and one discharge), the respective discharge capabilities of the negative electrodes were determined.

Furthermore, positive electrode-determining AA size (capability: 1000 mAh) sealed Ni-hydrogen rechargeable batteries were assembled using the above-described hydrogen absorbing Ni-based alloy powders as active materials for the negative electrodes, and subjected to self discharge tests. The results obtained are shown in Tables 1a and 1b.

(d) Self Discharge Test

In addition, using the hydrogen absorbing Ni-based alloy powders shown in Tables 1a and 1b, different negative electrode sheets were produced under the same conditions as the above-described negative electrodes used for the charge-discharge tests except that the size of the negative electrode sheets was changed to a plane size of 90 mm × 40 mm and a thickness of 0.60 to 0.65 mm and the capability of the negative electrode was changed to 1,450 to 1,500 mAh (the amount of active material to be filled: about 6 g). On the other hand, positive electrodes were produced by filling nickel hydroxide (Ni(OH)$_2$) as active material into nonwoven fabric of Ni whisker having a porosity of 95%, drying and pressing the filled nonwoven fabric to form nonwoven fabric composites having a plane size of 70 mm × 40 mm and a thickness of 0.65 to 0.70 mm (capability: 1,000 to 1,050 mAh), each of which which was provided with a lead. The negative and positive electrodes thus produced together with an electrolytic solution were arranged in a spiral form together with an intervening separator, and these members were held together with an electrolytic solution in a case which served also as a negative terminal to form various sealed Ni-hydrogen rechargeable batteries. In the batteries, the capability of the negative electrode was made larger than that of the positive electrode in order to construct positive electrode-capacity controlled rechargeable batteries.

The self discharge tests were performed by charging the sealed Ni-hydrogen rechargeable batteries at a rate of 0.2 C (200 mA) at room temperature for 7 hours, and leaving the batteries to stand in a thermostatic chamber kept at a temperature of 45° C. for 1 week or 2 weeks under the conditions of open circuit, i.e., without loads on the battery), followed by discharging at a rate of 0.2 C (200 mA) at room temperature. Then, percent residual capability was calculated for each test. The results obtained are shown in Tables 1a and 1b.

TABLE 1a

| | COMPOSITION (wt. %) | | | | | | | CHARACTERISTICS OF BATTERY | | | | |
| | | | | | | | | DISCHARGE CAPABILITY (mAh/g) | | | RESIDUAL CAPABILITY (%) | |
| SAMPLE | Ti | Zr | Mn | V | Fe | Al | Cr | Ni + Imp | After 100 C | After 200 C | After 300 C | After 1 week | After 2 weeks |
|---|---|---|---|---|---|---|---|---|---|---|---|---|---|
| A-1 | 5.1 | 27.7 | 10.1 | 6.9 | 0.34 | 0.09 | — | Bal | 276 | 267 | 258 | 70 | 63 |
| A-2 | 12.6 | 27.4 | 10.9 | 7.1 | 0.50 | 0.08 | — | Bal | 281 | 271 | 263 | 71 | 64 |
| A-3 | 19.6 | 27.3 | 10.4 | 6.8 | 0.41 | 0.10 | — | Bal | 288 | 278 | 269 | 70 | 61 |
| A-4 | 12.4 | 10.2 | 10.6 | 5.7 | 0.06 | 0.02 | — | Bal | 269 | 260 | 252 | 70 | 62 |
| A-5 | 12.6 | 36.5 | 10.4 | 5.5 | 0.07 | 0.04 | — | Bal | 296 | 286 | 277 | 74 | 66 |
| A-6 | 12.7 | 27.5 | 4.1 | 6.9 | 0.51 | 0.08 | — | Bal | 268 | 259 | 251 | 71 | 63 |
| A-7 | 12.4 | 27.4 | 17.9 | 7.0 | 0.52 | 0.07 | — | Bal | 266 | 257 | 249 | 70 | 62 |
| A-8 | 12.6 | 27.1 | 11.8 | 0.12 | 0.03 | 0.02 | — | Bal | 260 | 251 | 244 | 73 | 65 |
| A-9 | 12.3 | 27.6 | 11.7 | 9.8 | 3.6 | 0.89 | — | Bal | 278 | 269 | 260 | 70 | 63 |
| A-10 | 12.5 | 27.4 | 10.9 | 5.6 | 0.013 | 0.02 | — | Bal | 274 | 265 | 257 | 73 | 65 |
| A-11 | 12.6 | 27.6 | 11.3 | 5.8 | 4.9 | 0.08 | — | Bal | 266 | 257 | 249 | 70 | 63 |
| A-12 | 12.7 | 27.3 | 11.1 | 6.0 | 1.08 | 0.011 | — | Bal | 269 | 260 | 252 | 71 | 63 |
| A-13 | 12.6 | 27.0 | 11.3 | 6.2 | 1.03 | 3.48 | — | Bal | 258 | 249 | 242 | 72 | 64 |
| A-14 | 12.4 | 27.1 | 11.6 | 6.0 | 1.01 | 0.05 | — | Bal | 264 | 255 | 247 | 70 | 62 |
| A-15 | 12.3 | 27.1 | 10.8 | 6.1 | 1.00 | 0.04 | — | Bal | 260 | 251 | 243 | 72 | 63 |
| A-16 | 12.5 | 27.4 | 11.0 | 6.3 | 0.98 | 0.06 | — | Bal | 258 | 249 | 242 | 74 | 65 |
| A-17 | 12.6* | 27.2 | 10.8 | 6.9 | 0.47 | 0.08 | — | Bal | 271 | 250 | 120 | 58 | 47 |
| A-18 | 12.6 | 27.5 | 19.2* | 6.9 | 0.54 | 0.06 | — | Bal | 194 | 174 | 61 | 70 | 56 |
| A-19 | 12.5 | 27.5 | 11.2 | 6.0 | 1.05 | 4.13* | — | Bal | 224 | 208 | 99 | 73 | 60 |

"Imp" indicates "impurities".
"Bal" indicates "balance".

TABLE 1b

| | COMPOSITION (wt. %) | | | | | | | CHARACTERISTICS OF BATTERY | | | | |
| | | | | | | | | DISCHARGE CAPABILITY (mAh/g) | | | RESIDUAL CAPABILITY (%) | |
| SAMPLE | Ti | Zr | Mn | V | Fe | Al | Cr | Ni + Imp | After 100 C | After 200 C | After 300 C | After 1 week | After 2 weeks |
|---|---|---|---|---|---|---|---|---|---|---|---|---|---|
| a-1 | 3.6* | 27.1 | 11.0 | 7.0 | 0.51 | 0.09 | — | Bal | 238 | 221 | 211 | 63 | 53 |
| a-2 | 12.5 | 8.6* | 10.7 | 6.0 | 0.07 | 0.04 | — | Bal | 246 | 229 | 102 | 56 | 46 |
| a-3 | 12.6 | 39.5* | 10.5 | 5.8 | 0.06 | 0.07 | — | Bal | 245 | 228 | 118 | 67 | 53 |
| a-4 | 12.5 | 27.6 | 3.1* | 7.1 | 0.53 | 0.08 | — | Bal | 247 | 227 | 122 | 58 | 48 |
| a-5 | 12.4 | 27.3 | 11.0 | —* | 0.02 | 0.03 | — | Bal | 115 | 91 | 77 | 69 | 57 |
| a-6 | 12.5 | 27.6 | 10.9 | 11.6 | 3.8 | 0.91 | — | Bal | 286 | 266 | 258 | 52 | 33 |
| a-7 | 12.6 | 27.5 | 11.5 | 6.0 | 6.2* | 0.07 | — | Bal | 220 | 205 | 196 | 51 | 35 |
| a-8 | 12.8 | 27.4 | 11.2 | 5.9 | 1.07 | —* | — | Bal | 256 | 238 | 228 | 53 | 34 |
| a' | 14.2 | 24.1 | — | 30.5 | — | — | — | Bal | 270 | 254 | 241 | 19 | 5 |

"Imp" indicates "impurities".
"Bal" indicates "balance".
"C" stands for "cycles".

Tables 1a and 1b clearly show that the rechargeable batteries provided with the hydrogen absorbing Ni-based alloy samples Nos. A-1 to A-19 of the present invention as the active material for the negative electrode each had a high capability and showed considerably low reduction in the capability after repeated charge-discharge cycles as compared with the rechargeable batteries with the conventional hydrogen absorbing Ni-based alloy a', while the rechargeable batteries did not exhibit satisfactory performance with respect to discharge capability or self discharge or both when the contents of the components constituting the hydrogen absorbing Ni-based alloys were outside the scope of the present invention as seen in the batteries provided with the comparative hydrogen absorbing Ni-based alloy samples Nos. a-1 to a-8.

EXAMPLE 2

The same procedures as Example 1 were repeated to produce rechargeable batteries and test them except that the alloys shown in Tables 2a and 2b were used instead of those shown in Table 1. The results obtained are shown in Tables 2a and 2b.

chargeable batteries did not exhibit satisfactory performance with respect to discharge capability or self discharge or both when the contents of the components constituting the hydrogen absorbing Ni-based alloys were outside the scope of the present invention as seen in the batteries provided with the comparative hydrogen absorbing Ni-based alloy samples Nos. b-1 to b-9.

EXAMPLE 3

The same procedures as Example 1 were repeated to produce rechargeable batteries and test them except that the alloys shown in Tables 3a and 3b were used instead of those shown in Tables 1a and ab. The results obtained are shown in Tables 3a and 3b.

TABLE 2a

| | COMPOSITION (wt. %) | | | | | | | | CHARACTERISTICS OF BATTERY | | | | |
| --- | --- | --- | --- | --- | --- | --- | --- | --- | --- | --- | --- | --- | --- |
| | | | | | | | | | DISCHARGE CAPABILITY (mAh/g) | | | RESIDUAL CAPABILITY (%) | |
| SAMPLE | Ti | Zr | Mn | V | Cu | Fe | Al | Cr | Ni + Imp | After 100 C | After 200 C | After 300 C | After 1 week | After 2 weeks |
| B-1 | 5.1 | 27.5 | 10.9 | 7.4 | 4.2 | 0.31 | 0.10 | — | Bal | 280 | 270 | 263 | 71 | 64 |
| B-2 | 12.8 | 27.6 | 10.3 | 7.2 | 4.1 | 0.48 | 0.09 | — | Bal | 286 | 275 | 268 | 72 | 65 |
| B-3 | 19.7 | 27.5 | 10.6 | 7.3 | 4.3 | 0.39 | 0.07 | — | Bal | 293 | 283 | 274 | 71 | 62 |
| B-4 | 12.3 | 10.2 | 10.4 | 5.6 | 4.0 | 0.05 | 0.03 | — | Bal | 272 | 263 | 255 | 71 | 64 |
| B-5 | 11.9 | 36.6 | 10.3 | 5.4 | 4.2 | 0.08 | 0.05 | — | Bal | 298 | 288 | 279 | 76 | 68 |
| B-6 | 12.3 | 27.7 | 4.4 | 6.7 | 4.1 | 0.49 | 0.06 | — | Bal | 273 | 264 | 256 | 72 | 64 |
| B-7 | 12.5 | 27.3 | 17.8 | 7.1 | 4.3 | 0.51 | 0.05 | — | Bal | 270 | 261 | 253 | 71 | 63 |
| B-8 | 12.4 | 27.4 | 11.9 | 0.14 | 4.2 | 0.04 | 0.03 | — | Bal | 263 | 254 | 247 | 74 | 66 |
| B-9 | 12.6 | 27.6 | 11.7 | 9.6 | 4.1 | 3.7 | 0.91 | — | Bal | 286 | 277 | 268 | 71 | 63 |
| B-10 | 12.4 | 27.5 | 11.6 | 7.0 | 0.12 | 0.48 | 0.09 | — | Bal | 261 | 259 | 246 | 72 | 64 |
| B-11 | 12.5 | 27.4 | 11.4 | 7.2 | 6.9 | 0.51 | 0.10 | — | Bal | 270 | 263 | 255 | 70 | 62 |
| B-12 | 12.7 | 27.3 | 10.8 | 5.7 | 4.2 | 0.011 | 0.03 | — | Bal | 278 | 269 | 260 | 74 | 66 |
| B-13 | 12.5 | 27.5 | 11.4 | 5.9 | 4.1 | 4.8 | 0.07 | — | Bal | 269 | 260 | 252 | 71 | 63 |
| B-14 | 12.4 | 27.1 | 11.2 | 6.1 | 4.0 | 1.09 | 0.015 | — | Bal | 272 | 263 | 255 | 72 | 64 |
| B-15 | 12.5 | 27.2 | 11.5 | 6.2 | 4.3 | 1.04 | 3.46 | — | Bal | 264 | 252 | 246 | 73 | 65 |
| B-16 | 12.5 | 27.3 | 11.4 | 6.1 | 4.2 | 1.02 | 0.04 | 0.054 | Bal | 267 | 258 | 250 | 71 | 63 |
| B-17 | 12.4 | 27.3 | 10.9 | 6.2 | 4.3 | 0.99 | 0.05 | 3.31 | Bal | 264 | 255 | 247 | 73 | 64 |
| B-18 | 12.6 | 27.5 | 11.2 | 6.3 | 4.2 | 1.00 | 0.07 | 5.96 | Bal | 260 | 251 | 244 | 75 | 66 |
| B-19 | 12.6* | 27.4 | 10.9 | 6.8 | 4.2 | 0.49 | 0.09 | — | Bal | 275 | 254 | 123 | 60 | 49 |
| B-20 | 12.5 | 27.6 | 19.0* | 6.8 | 4.0 | 0.55 | 0.07 | — | Bal | 224 | 201 | 87 | 73 | 58 |
| B-21 | 12.8 | 27.6 | 11.1 | 5.9 | 4.1 | 1.04 | 3.79* | — | Bal | 226 | 210 | 101 | 74 | 61 |

"Imp" indicates "impurities".
"Bal" indicates "balance".
"C" stands for "cycles"

TABLE 2b

| | COMPOSITION (wt. %) | | | | | | | | CHARACTERISTICS OF BATTERY | | | | |
| --- | --- | --- | --- | --- | --- | --- | --- | --- | --- | --- | --- | --- | --- |
| | | | | | | | | | DISCHARGE CAPABILITY (mAh/g) | | | RESIDUAL CAPABILITY (%) | |
| SAMPLE | Ti | Zr | Mn | V | Cu | Fe | Al | Cr | Ni + Imp | After 100 C | After 200 C | After 300 C | After 1 week | After 2 weeks |
| b-1 | 3.8* | 27.3 | 11.1 | 7.1 | 4.1 | 0.52 | 0.11 | — | Bal | 241 | 224 | 214 | 65 | 54 |
| b-2 | 12.4 | 8.7* | 10.6 | 5.9 | 4.3 | 0.08 | 0.03 | — | Bal | 249 | 233 | 105 | 58 | 48 |
| b-3 | 12.7 | 39.4* | 10.4 | 5.7 | 4.2 | 0.07 | 0.05 | — | Bal | 246 | 229 | 119 | 67 | 55 |
| b-4 | 12.4 | 27.5 | 2.9* | 7.0 | 4.1 | 0.52 | 0.06 | — | Bal | 254 | 234 | 127 | 61 | 50 |
| b-5 | 12.6 | 27.5 | 11.1 | — | 4.1 | 0.03 | 0.02 | — | Bal | 117 | 94 | 80 | 71 | 56 |
| b-6 | 12.4 | 27.4 | 10.8 | 11.9* | 4.0 | 3.90 | 0.92 | — | Bal | 294 | 273 | 265 | 54 | 35 |
| b-7 | 12.6 | 27.5 | 11.2 | 6.9 | 8.4* | 0.49 | 0.09 | — | Bal | 264 | 247 | 196 | 51 | 32 |
| b-8 | 12.4 | 27.6 | 11.4 | 6.1 | 4.1 | 6.5* | 0.06 | — | Bal | 223 | 207 | 199 | 54 | 38 |
| b-9 | 12.6 | 27.3 | 11.3 | 5.8 | 4.2 | 1.06 | —* | — | Bal | 258 | 240 | 230 | 55 | 36 |
| b' | 14.2 | 24.1 | — | 30.5 | — | — | — | — | Bal | 270 | 254 | 241 | 19 | 5 |

"Imp" indicates "impurities".
"Bal" indicates "balance".
"C" stands for "cycles"

From the results shown in Tables 2a and 2b it is apparent that the rechargeable batteries provided with the hydrogen absorbing Ni-based alloy samples Nos. B-1 to B-21 of the present invention as the active material for the negative electrode each had a high capability and showed considerably low reduction in the capability after repeated charge-discharge cycles as compared with the rechargeable batteries with the conventional hydrogen absorbing Ni-based alloy b', while the re- Further, the hydrogen absorbing alloys were tested for corrosion resistance according to the so-called Huey test. Test samples were made by cutting the ingots of the various hydrogen absorbed Ni-based alloys and embedding them into a plastic resin, followed by grinding the surface to be corroded with Emery Paper No. 600. The thus-finished samples were introduced into an Erlenmeyer flask provided with a cold finger type condenser and held in a boiling 30% aqueous KOH solution for 144 hours to perform corrosion tests to determine corrosion resistance to an alkaline electrolytic solution negative electrode tended to show deteriorated discharge capability and self discharge characteristics TABLE 3a

| SAMPLE | COMPOSITION (wt. %) | | | | | | | | | CHARACTERISTICS OF BATTERY | | | | | REDUCTION IN WEIGHT CORROSION (mg/cm²/hr) |
|---|---|---|---|---|---|---|---|---|---|---|---|---|---|---|---|
| | | | | | | | | | | DISCHARGE CAPABILITY (mAh/g) | | | RESIDUAL CAPABILITY (%) | | |
| | Ti | Zr | Mn | V | W | Fe | Al | Cr | Ni + Imp | After 100 C | After 200 C | After 300 C | After 1 week | After 2 weeks | |
| C-1 | 5.3 | 23.9 | 8.7 | 5.3 | 0.12 | 0.35 | 0.11 | — | Bal | 279 | 268 | 261 | 72 | 65 | 7.4 |
| C-2 | 10.7 | 23.8 | 8.6 | 5.1 | 0.14 | 0.51 | 0.07 | — | Bal | 285 | 273 | 266 | 73 | 66 | 6.2 |
| C-3 | 24.6 | 23.6 | 8.3 | 5.2 | 0.11 | 0.45 | 0.09 | — | Bal | 295 | 281 | 275 | 72 | 63 | 2.6 |
| C-4 | 10.5 | 10.4 | 8.2 | 5.4 | 0.5 | 0.06 | 0.04 | — | Bal | 274 | 264 | 256 | 73 | 65 | 3.7 |
| C-5 | 10.3 | 36.4 | 8.5 | 5.2 | 0.4 | 0.09 | 0.05 | — | Bal | 297 | 290 | 281 | 77 | 70 | 2.9 |
| C-6 | 10.4 | 23.9 | 4.5 | 5.1 | 1.6 | 0.51 | 0.07 | — | Bal | 275 | 265 | 257 | 74 | 65 | 2.6 |
| C-7 | 10.3 | 23.8 | 19.5 | 5.0 | 1.7 | 0.48 | 0.06 | — | Bal | 271 | 262 | 250 | 72 | 62 | 1.4 |
| C-8 | 10.5 | 23.5 | 8.2 | 0.13 | 3.0 | 3.60 | 0.94 | — | Bal | 265 | 255 | 248 | 75 | 67 | 0.9 |
| C-9 | 10.4 | 23.6 | 8.1 | 9.4 | 3.1 | 3.90 | 0.93 | — | Bal | 287 | 279 | 271 | 72 | 64 | 2.6 |
| C-10 | 10.5 | 23.1 | 8.3 | 5.1 | 0.038 | 0.05 | 0.03 | — | Bal | 260 | 254 | 245 | 76 | 69 | 8.8 |
| C-11 | 10.3 | 23.2 | 8.0 | 5.2 | 12.4 | 0.06 | 0.04 | — | Bal | 272 | 269 | 261 | 74 | 67 | 0.4 |
| C-12 | 10.5 | 23.5 | 8.2 | 5.4 | 7.0 | 0.013 | 0.05 | — | Bal | 279 | 268 | 262 | 75 | 66 | 1.9 |
| C-13 | 10.4 | 23.6 | 8.3 | 5.5 | 7.1 | 4.90 | 0.08 | — | Bal | 271 | 262 | 253 | 72 | 64 | 3.8 |
| C-14 | 10.5 | 23.2 | 8.1 | 5.3 | 6.9 | 1.08 | 0.016 | — | Bal | 273 | 264 | 256 | 73 | 65 | 2.8 |
| C-15 | 10.6 | 23.3 | 8.2 | 5.0 | 7.0 | 1.06 | 4.39 | — | Bal | 265 | 253 | 247 | 75 | 66 | 0.9 |
| C-16 | 10.4 | 23.5 | 8.0 | 5.1 | 7.1 | 1.03 | 0.05 | 0.059 | Bal | 268 | 259 | 252 | 72 | 64 | 2.3 |
| C-17 | 10.4 | 23.6 | 8.1 | 5.0 | 7.0 | 1.01 | 0.06 | 3.04 | Bal | 264 | 255 | 247 | 74 | 70 | 1.7 |
| C-18 | 10.5 | 23.2 | 8.3 | 5.2 | 6.9 | 0.98 | 0.08 | 5.86 | Bal | 261 | 252 | 245 | 76 | 78 | 0.8 |

"Imp" indicates "impurities".
"Bal" indicates "balance".
"C" stands for "cycles"

TABLE 3b

| SAMPLE | COMPOSITION (wt. %) | | | | | | | | | CHARACTERISTICS OF BATTERY | | | | | REDUCTION IN WEIGHT CORROSION (mg/cm²/hr) |
|---|---|---|---|---|---|---|---|---|---|---|---|---|---|---|---|
| | | | | | | | | | | DISCHARGE CAPABILITY (mAh/g) | | | RESIDUAL CAPABILITY (%) | | |
| | Ti | Zr | Mn | V | W | Fe | Al | Cr | Ni + Imp | After 100 C | After 200 C | After 300 C | After 1 week | After 2 weeks | |
| c-1 | 3.6* | 23.4 | 8.5 | 5.2 | 0.12 | 0.34 | 0.10 | — | Bal | 240 | 223 | 215 | 67 | 55 | 11.0 |
| c-2 | 27.3* | 23.5 | 8.4 | 5.1 | 0.13 | 0.50 | 0.07 | — | Bal | 276 | 256 | 125 | 61 | 50 | 2.1 |
| c-3 | 10.3 | 8.6* | 8.3 | 5.2 | 0.5 | 0.08 | 0.04 | — | Bal | 250 | 234 | 107 | 59 | 48 | 3.8 |
| c-4 | 10.4 | 39.6* | 8.5 | 5.1 | 0.6 | 0.07 | 0.03 | — | Bal | 248 | 231 | 121 | 68 | 56 | 1.8 |
| c-5 | 10.5 | 23.2 | 2.8* | 5.0 | 1.8 | 0.52 | 0.07 | — | Bal | 255 | 235 | 129 | 63 | 51 | 2.9 |
| c-6 | 10.3 | 23.6 | 22.4* | 5.2 | 1.6 | 0.51 | 0.06 | — | Bal | 226 | 206 | 88 | 74 | 59 | 1.1 |
| c-7 | 10.4 | 23.5 | 8.6 | —* | 3.3 | 0.04 | 0.05 | — | Bal | 119 | 96 | 82 | 73 | 58 | 0.6 |
| c-8 | 10.5 | 23.4 | 8.7 | 12.1* | 3.2 | 3.70 | 0.96 | — | Bal | 295 | 274 | 266 | 56 | 37 | 3.8 |
| c-9 | 10.6 | 23.2 | 8.2 | 5.1 | —* | 0.08 | 0.05 | — | Bal | 241 | 213 | 201 | 58 | 51 | 12.3 |
| c-10 | 10.4 | 23.5 | 8.5 | 5.3 | 16.2* | 0.06 | 0.03 | — | Bal | 263 | 240 | 214 | 81 | 74 | 0.2 |
| c-11 | 10.6 | 23.4 | 8.4 | 5.1 | 7.0 | 6.70* | 0.07 | — | Bal | 225 | 209 | 201 | 55 | 39 | 4.5 |
| c-12 | 10.3 | 23.5 | 8.6 | 5.6 | 7.2 | 1.02 | —* | — | Bal | 259 | 241 | 232 | 56 | 37 | 3.2 |
| c-13 | 10.8 | 23.6 | 8.3 | 5.4 | 6.9 | 1.01 | 6.54* | — | Bal | 227 | 211 | 103 | 76 | 63 | 0.5 |
| c' | 14.2 | 24.1 | — | 30.5 | — | — | — | — | Bal | 270 | 254 | 241 | 19 | 5 | 12.0 |

"Imp" indicates "impurities".
"Bal" indicates "balance".
"C" stands for "cycles"

It can be seen from the results shown in Tables 3a and 3b that the hydrogen absorbing Ni-based alloys of the present invention had excellent corrosion resistance to alkaline electrolytic solutions as compared with the conventional hydrogen absorbing alloy, and that the rechargeable batteries provided with the hydrogen absorbing Ni-based alloy samples Nos. C-1 to C-18 of the present invention as the active material for the negative electrode each had a high capability and showed considerably low reduction in the capability after repeated charge-discharge cycles as compared with the rechargeable batteries provided with the comparative hydrogen absorbing Ni-based alloy c-1 to c-13, while the corrosion resistance of the alloys to alkaline electrolytic solutions decreased and the rechargeable batteries provided with the alloys as the active material for the negative electrode tended to show deteriorated discharge capability and self discharge characteristics when one or more components constituting the hydrogen absorbing Ni-based alloys were present in amounts outside the scope of the present invention.

EXAMPLE 4

The same procedures as Example 3 were repeated to produce rechargeable batteries and test them except that the alloys shown in Tables 4a and 4b were used instead of those shown in Tables 3a and 3b. The results obtained are shown in Tables 4a and 4b.

Furthermore, the same corrosion tests as in Example 3 were conducted except that the test samples were held in the 30% aqueous KOH solution for 240 hours instead of 144 hours. The results obtained were also shown in Tables 4a and 4b.

TABLE 4a

| SAMPLE | Ti | Zr | Mn | V | Cu | W | Fe | Al | Cr | Ni + Imp |
|---|---|---|---|---|---|---|---|---|---|---|
| D-1 | 5.2 | 23.8 | 8.6 | 5.2 | 3.3 | 0.13 | 0.32 | 0.12 | — | Bal |
| D-2 | 10.6 | 23.5 | 8.4 | 5.5 | 3.4 | 0.12 | 0.45 | 0.08 | — | Bal |
| D-3 | 24.7 | 23.6 | 8.5 | 5.4 | 3.6 | 0.14 | 0.48 | 0.06 | — | Bal |
| D-4 | 10.4 | 10.5 | 8.6 | 5.3 | 3.2 | 0.6 | 0.07 | 0.05 | — | Bal |
| D-5 | 10.2 | 36.5 | 8.4 | 5.1 | 3.3 | 0.5 | 0.06 | 0.04 | — | Bal |
| D-6 | 10.6 | 23.6 | 4.6 | 5.0 | 3.1 | 1.7 | 0.53 | 0.08 | — | Bal |
| D-7 | 10.4 | 23.5 | 19.6 | 5.3 | 3.2 | 1.5 | 0.50 | 0.07 | — | Bal |
| D-8 | 10.6 | 23.4 | 8.5 | 0.15 | 3.3 | 3.1 | 3.7 | 0.96 | — | Bal |
| D-9 | 10.3 | 23.3 | 8.3 | 9.5 | 3.1 | 3.0 | 3.8 | 0.94 | — | Bal |
| D-10 | 10.6 | 23.4 | 8.4 | 5.1 | 0.14 | 7.2 | 0.50 | 0.07 | — | Bal |
| D-11 | 10.4 | 23.5 | 8.6 | 5.2 | 6.8 | 7.3 | 0.48 | 0.08 | — | Bal |
| D-12 | 10.6 | 23.2 | 8.2 | 5.3 | 3.4 | 0.040 | 0.06 | 0.04 | — | Bal |
| D-13 | 10.3 | 23.4 | 8.1 | 5.4 | 3.5 | 12.3 | 0.07 | 0.06 | — | Bal |
| D-14 | 10.4 | 23.6 | 8.3 | 5.6 | 3.6 | 7.2 | 1.014 | 0.05 | — | Bal |
| D-15 | 10.3 | 23.4 | 8.4 | 5.3 | 3.2 | 7.0 | 4.7 | 0.08 | — | Bal |
| D-16 | 10.2 | 23.3 | 8.2 | 5.5 | 3.1 | 6.8 | 1.06 | 0.017 | — | Bal |
| D-17 | 10.4 | 23.5 | 8.3 | 5.6 | 3.5 | 7.1 | 1.07 | 4.41 | — | Bal |
| D-18 | 10.7 | 23.4 | 8.2 | 5.3 | 3.2 | 6.9 | 1.01 | 0.06 | 0.061 | Bal |
| D-19 | 10.5 | 23.8 | 8.1 | 5.4 | 3.1 | 7.1 | 1.02 | 0.07 | 2.03 | Bal |
| D-20 | 10.3 | 23.5 | 8.5 | 5.6 | 3.0 | 7.2 | 1.01 | 0.09 | 4.12 | Bal |
| D-21 | 10.4 | 23.6 | 8.4 | 5.2 | 3.3 | 7.0 | 0.99 | 0.08 | 5.89 | Bal |

| | CHARACTERISTICS OF BATTERY | | | | | |
|---|---|---|---|---|---|---|
| | DISCHARGE CAPABILITY (mAh/g) | | | RESIDUAL CAPABILITY (%) | | REDUCTION IN WEIGHT CORROSION (mg/cm²/hr) |
| SAMPLE | After 120 C | After 240 C | After 360 C | After 1 week | After 2 weeks | |
| D-1 | 282 | 271 | 266 | 73 | 66 | 6.9 |
| D-2 | 289 | 278 | 273 | 74 | 67 | 5.7 |
| D-3 | 298 | 284 | 276 | 73 | 64 | 2.4 |
| D-4 | 276 | 265 | 258 | 75 | 66 | 3.2 |
| D-5 | 299 | 293 | 282 | 79 | 73 | 2.1 |
| D-6 | 277 | 267 | 258 | 76 | 67 | 2.3 |
| D-7 | 273 | 264 | 254 | 74 | 64 | 1.2 |
| D-8 | 267 | 258 | 250 | 77 | 69 | 0.7 |
| D-9 | 293 | 283 | 276 | 73 | 65 | 2.4 |
| D-10 | 265 | 261 | 249 | 75 | 67 | 5.0 |
| D-11 | 276 | 266 | 258 | 73 | 64 | 2.1 |
| D-12 | 267 | 256 | 248 | 78 | 71 | 8.5 |
| D-13 | 279 | 273 | 267 | 79 | 73 | 0.3 |
| D-14 | 283 | 271 | 266 | 77 | 69 | 1.7 |
| D-15 | 276 | 263 | 255 | 73 | 65 | 3.6 |
| D-16 | 275 | 267 | 261 | 75 | 66 | 2.5 |
| D-17 | 268 | 257 | 249 | 77 | 69 | 0.7 |
| D-18 | 271 | 263 | 254 | 73 | 65 | 2.1 |
| D-19 | 269 | 256 | 248 | 74 | 66 | 1.8 |
| D-20 | 265 | 254 | 247 | 76 | 68 | 1.0 |
| D-21 | 263 | 253 | 246 | 78 | 69 | 0.6 |

"Imp" indicates "impurities".
"Bal" indicates "balance".
"C" stands for "cycles"

TABLE 4b

| SAMPLE | Ti | Zr | Mn | V | Cu | W | Fe | Al | Cr | Ni + Imp |
|---|---|---|---|---|---|---|---|---|---|---|
| d-1 | 3.7* | 23.6 | 8.6 | 5.4 | 3.1 | 0.14 | 0.33 | 0.11 | — | Bal |
| d-2 | 27.5* | 23.2 | 8.3 | 5.3 | 3.5 | 0.16 | 0.49 | 0.08 | — | Bal |
| d-3 | 10.5 | 8.4* | 8.5 | 5.4 | 3.6 | 0.7 | 0.06 | 0.05 | — | Bal |
| d-4 | 10.3 | 39.8* | 8.6 | 5.2 | 3.5 | 0.5 | 0.06 | 0.04 | — | Bal |
| d-5 | 10.6 | 23.3 | 2.7* | 5.1 | 3.2 | 1.6 | 0.51 | 0.08 | — | Bal |
| d-6 | 10.4 | 23.4 | 22.5* | 5.3 | 3.4 | 1.5 | 0.53 | 0.05 | — | Bal |
| d-7 | 10.5 | 23.6 | 8.7 | —* | 3.6 | 3.0 | 0.02 | 0.03 | — | Bal |
| d-8 | 10.3 | 23.5 | 8.6 | 12.3* | 3.5 | 3.1 | 3.6 | 0.93 | — | Bal |
| d-9 | 10.5 | 23.6 | 8.4 | 5.4 | 8.7* | 7.2 | 0.51 | 0.06 | — | Bal |
| d-10 | 10.4 | 23.5 | 8.3 | 5.2 | 3.1 | —* | 0.07 | 0.06 | — | Bal |
| d-11 | 10.5 | 23.4 | 8.4 | 5.4 | 3.3 | 16.4* | 0.08 | 0.04 | — | Bal |
| d-12 | 10.4 | 23.3 | 8.5 | 5.2 | 3.6 | 7.1 | 6.6* | 0.09 | — | Bal |
| d-13 | 10.7 | 23.4 | 8.6 | 5.7 | 3.4 | 7.0 | 1.03 | —* | — | Bal |
| d-14 | 10.6 | 23.5 | 8.3 | 5.4 | 3.2 | 6.8 | 1.02 | 6.52* | — | Bal |
| d' | 14.2 | 24.1 | — | 30.5 | — | — | — | — | — | Bal |

| | CHARACTERISTICS OF BATTERY | | | | | |
|---|---|---|---|---|---|---|
| | DISCHARGE CAPABILITY (mAh/g) | | | RESIDUAL CAPABILITY (%) | | REDUCTION IN WEIGHT CORROSION |
| | After | After | After | After | After | |

TABLE 4b-continued

| SAMPLE | 120 C | 240 C | 360 C | 1 week | 2 weeks | (mg/cm²/hr) |
|---|---|---|---|---|---|---|
| d-1 | 243 | 226 | 216 | 69 | 56 | 10.2 |
| d-2 | 278 | 258 | 127 | 63 | 51 | 1.9 |
| d-3 | 253 | 236 | 109 | 60 | 50 | 3.4 |
| d-4 | 250 | 233 | 124 | 69 | 57 | 1.6 |
| d-5 | 256 | 236 | 131 | 66 | 54 | 2.7 |
| d-6 | 228 | 208 | 90 | 75 | 61 | 1.0 |
| d-7 | 201 | 98 | 86 | 74 | 60 | 0.5 |
| d-8 | 297 | 276 | 269 | 58 | 39 | 3.2 |
| d-9 | 268 | 251 | 201 | 56 | 36 | 1.6 |
| d-10 | 244 | 218 | 206 | 61 | 54 | 12.1 |
| d-11 | 265 | 246 | 219 | 83 | 76 | 0.1 |
| d-12 | 228 | 210 | 203 | 58 | 42 | 4.1 |
| d-13 | 263 | 244 | 235 | 59 | 39 | 3.0 |
| d-14 | 229 | 213 | 108 | 78 | 68 | 0.4 |
| d' | 270 | 254 | 241 | 19 | 5 | 12.0 |

"Imp" indicates "impurities".
"Bal" indicates "balance".
"C" stands for "cycles"

Tables 4a and 4b show the same tendency as shown in Tables 3a and 3b for the hydrogen absorbing Ni-based alloy samples D-1 to D-21 of the present invention and for the rechargeable batteries provided with these alloys.

EXAMPLE 5

Various molten Ni-based alloys having compositions shown in Table 5 were prepared in a water-cooled copper crucible using argon arc smelting furnace and cast into ingots. The ingots were annealed in Ar gas at a temperature of 1,000° C. for 10 hours, followed by pulverizing using a stamp mill and a jaw crusher to form crude powders having a particle size of not greater than 2 mm. The crude powders were further ground using an attriter to obtain fine powders having a particle size of not greater than 350 mesh. Thus, the hydrogen absorbing Ni-based alloy samples E-1 and E-2 of the present invention, the comparative alloy samples e-1 to e-9, and the conventional alloy sample e' were prepared.

These hydrogen absorbing alloy samples were treated in the same manner as in Example 1 to produce negative electrodes. On the other hand, positive electrodes were produced in the same manner as in Example 1. Various open type rechargeable batteries were assembled using the above-described negative and positive electrodes in the same manner as in Example 1, and the discharge capability of these batteries was measured. The results obtained are shown in Table 5.

Furthermore, various sealed Ni-hydrogen rechargeable batteries were produced in the same manner as in Example 1 using the hydrogen absorbing alloys shown in Table 5, and subjected to self discharge tests in the same manner as in Example 1. The results obtained are shown in Table 5.

TABLE 5

| | COMPOSITION OF HYDROGEN ABSORBING ALLOY | | | | | | | | | DISCHARGE CAPABILITY (mAh) | | | % RESIDUAL CAPABILITY | |
|---|---|---|---|---|---|---|---|---|---|---|---|---|---|---|
| SAMPLE | Ti | Zr | Mn | V | Cu | Fe | Al | Cr | Ni + Imp | After 100 C | After 200 C | After 300 C | After 1 Week | After 2 Weeks |
| E-1 | 11.9 | 26.4 | 11.6 | 5.9 | 4.7 | 1.67 | 0.28 | — | 37.55 | 270 | 254 | 244 | 76 | 67 |
| E-2 | 11.9 | 26.4 | 11.6 | 6.1 | 4.6 | 0.58 | 0.32 | 0.18 | 38.32 | 268 | 254 | 243 | 77 | 68 |
| e-1 | 9.2 | 30.6 | 11.4 | 7.3 | 4.5 | — | — | — | 37.0 | | | | | |
| e-2 | 15.6 | 20.8 | 11.8 | 7.6 | 4.8 | — | — | — | 39.4 | | | | | |
| e-3 | 10.7 | 24.3 | 6.9 | 6.7 | 4.1 | — | — | — | 47.3 | | | | | |
| e-4 | 11.9 | 26.6 | 15.2 | 7.6 | 4.7 | — | — | — | 34.0 | | | | | |
| e-5 | 11.6 | 26.6 | 11.4 | 2.9 | 4.6 | — | — | — | 42.9 | | | | | |
| e-6 | 12.1 | 26.8 | 4.8 | 19.7 | 4.6 | — | — | — | 32.0 | 278 | 260 | 251 | 36 | 15 |
| e-7 | 11.8 | 26.9 | 3.1 | 15.6 | 2.2 | — | — | — | 40.4 | 261 | 248 | 237 | 41 | 22 |
| e-8 | 11.6 | 26.7 | 11.5 | 7.4 | 7.5 | — | — | — | 35.3 | | | | | |
| e-9 | 12.1 | 26.5 | 17.5 | 12.5 | 5.9 | — | — | — | 25.5 | | | | | |
| e' | 13.8 | 24.8 | — | 28.6 | — | — | — | — | 32.8 | 288 | 271 | 258 | 20 | 5 |

Note
"Imp" stands for "impurities".
"C" stands for "cycles".

Table 5 shows that the rechargeable batteries provided with the hydrogen absorbing Ni-based alloy samples Nos. E-1 and E-2 of the present invention each had a high capability and suffered much less reduction in the capability after repeated charge-discharge cycles as compared with the rechargeable batteries provided with the comparative alloys samples Nos. e-1 to e-9 and that provided with the conventional alloy e'. The comparative rechargeable batteries using the comparative alloy samples Nos. e-6 and e-7 and the conventional rechargeable battery showed low % residual capability after repeated charge-discharge cycles although they had a capability substantially in the same level as that of the rechargeable batteries of the present invention.

What is claimed is:

1. A hydrogen absorbing Ni-based alloy comprising 5 to 25% by weight of titanium (Ti), 10 to 35% by weight of zirconium (Zr), 4 to 20% by weight of manganese (Mn), 0.1 to 12% by weight of vanadium (V), 0.01 to 5% by weight of iron (Fe), and 0.01 to 4.5% by weight of aluminum (Al).

2. A hydrogen absorbing Ni-based alloy as claimed in claim 1, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, and balance Ni and unavoidable impurities.

3. A hydrogen absorbing Ni-based alloy as claimed in claim 1, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.05 to 6% by weight of Cr, and balance Ni and unavoidable impurities.

4. A hydrogen absorbing Ni-based alloy as claimed in claim 1, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu and balance Ni and unavoidable impurities.

5. A hydrogen absorbing Ni-based alloy as claimed in claim 1, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu, 0.05 to 6% by weight of Cr, and balance Ni and unavoidable impurities.

6. A hydrogen absorbing Ni-based alloy as claimed in claim 1, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.01 to 13% by weight of W, and balance Ni and unavoidable impurities.

7. A hydrogen absorbing Ni-based alloy as claimed in claim 1, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.05 to 6% by weight of Cr, 0.01 to 13% by weight of W, and balance Ni and unavoidable impurities.

8. A hydrogen absorbing Ni-based alloy as claimed in claim 1, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.01 to 13% by weight of W, and balance Ni and unavoidable impurities.

9. A hydrogen absorbing Ni-based alloy as claimed in claim 1, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.05 to 6% by weight of Cr, 0.01 to 13% by weight of W, and balance Ni and unavoidable impurities.

10. A hydrogen absorbing Ni-based alloy as claimed in claim 1, wherein said alloy consists of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe and Al provided that Fe and Al are present in amounts not smaller than 0.01% by weight, respectively, and balance Ni and unavoidable impurities.

11. A hydrogen absorbing Ni-based alloy as claimed in claim 1, wherein said alloy consists of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe, Al and Cr provided that Fe and Al are present in amounts not smaller than 0.01% by weight, respectively, and that Cr is present in an amount not smaller than 0.05% by weight, and balance Ni and unavoidable impurities.

12. A sealed Ni-hydrogen rechargeable battery comprising a negative electrode provided with a hydrogen absorbing alloy as an active material, an Ni positive electrode, a separator and an alkaline electrolyte, wherein the hydrogen absorbing alloy is comprised of a hydrogen absorbing Ni-based alloy comprising 5 to 25% by weight of Ti, 10 to 37% by weight of Zr, 4 to 20% by weight of Mn, 0.1 to 12% by weight of V, 0.01 to 5% by weight Fe, and 0.01 to 4.5% by weight of Al.

13. A sealed Ni-hydrogen rechargeable battery as claimed in claim 12, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, and balance Ni and unavoidable impurities.

14. A sealed Ni-hydrogen rechargeable battery as claimed in claim 12, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.05 to 6% by weight of Cr, and balance Ni and unavoidable impurities.

15. A sealed Ni-hydrogen rechargeable battery as claimed in claim 12, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu and balance Ni and unavoidable impurities.

16. A sealed Ni-hydrogen rechargeable battery as claimed in claim 12, wherein said alloy consists of 5 to 20% by weight of Ti, 10 to 37% by weight of Zr, 4 to 18% by weight of Mn, 0.1 to 10% by weight of V, 0.01 to 5% by weight of Fe, 0.01 to 3.5% by weight of Al, 0.1 to 7% by weight of Cu, 0.05 to 6% by weight of Cr, and balance Ni and unavoidable impurities.

17. A sealed Ni-hydrogen rechargeable battery as claimed in claim 12, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.01 to 13% by weight of W, and balance Ni and unavoidable impurities.

18. A sealed Ni-hydrogen rechargeable battery as claimed in claim 12, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.05 to 6% by weight of Cr, 0.01 to 13% by weight of W, and balance Ni and unavoidable impurities.

19. A sealed Ni-hydrogen rechargeable battery as claimed in claim 12, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.01 to 13% by weight of W, and balance Ni and unavoidable impurities.

20. A sealed Ni-hydrogen rechargeable battery as claimed in claim 12, wherein said alloy consists of 5 to 25% by weight of Ti, 10 to 37% by weight of Zr, 4 to 20% by weight of Mn, 0.1 to 10% by weight of V, 0.01 to 5% by weight of Fe, 0.01 to 4.5% by weight of Al, 0.1 to 7% by weight of Cu, 0.05 to 6% by weight of Cr, 0.01 to 13% by weight of W, and balance Ni and unavoidable impurities.

21. A sealed Ni-hydrogen rechargeable battery as claimed in claim 12, wherein said alloy consists of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe and Al provided that Fe and Al are present in amounts not smaller than 0.01% by weight, respectively, and balance Ni and unavoidable impurities.

22. A sealed Ni-hydrogen rechargeable battery as claimed in claim 12, wherein said alloy consists of 10.1 to 13.9% by weight (13 to 18 atomic %) of Ti, 22.3 to 29.4% by weight (15 to 20 atomic %) of Zr, 8.9 to 13.3% by weight (10 to 15 atomic %) of Mn, 4.1 to 9.9% by weight (5 to 12 atomic %) of V, 3.1 to 6.1% by weight (3 to 6 atomic %) of Cu, 0.1 to 2.7% by weight in total of Fe, Al and Cr provided that Fe and Al are present in amounts not smaller than 0.01% by weight, respectively, and that Cr is present in an amount not smaller than 0.05% by weight, and balance Ni and unavoidable impurities.

* * * * *

UNITED STATES PATENT AND TRADEMARK OFFICE
CERTIFICATE OF CORRECTION

PATENT NO. : 4,983,474

DATED : January 8, 1991

INVENTOR(S) : Hidekazu DOI, et al.

It is certified that error appears in the above-identified patent and that said Letters Patent is hereby corrected as shown below:

Column 16, line 60, "35%" should read --37%--.

Signed and Sealed this

Tenth Day of October, 1995

*Attest:*

BRUCE LEHMAN

*Attesting Officer*     *Commissioner of Patents and Trademarks*